United States Patent [19]
Litchfield

[11] 3,762,438
[45] Oct. 2, 1973

[54] PRESSURE BALANCED CONNECTION
[75] Inventor: Mason R. Litchfield, Houston, Tex.
[73] Assignee: B & L Machine Company, Incorporated, Houston, Tex.
[22] Filed: Feb. 18, 1971
[21] Appl. No.: 116,568

[52] U.S. Cl............... 137/515.5, 137/527, 137/798, 285/175, 285/176
[51] Int. Cl............................................. F16k 15/03
[58] Field of Search................. 137/515.5, 527, 798; 285/175, 176

[56] References Cited
UNITED STATES PATENTS
1,774,151  8/1930  Olley............................... 285/176 X
2,882,923  4/1959  Smolensky....................... 137/515.5

Primary Examiner—Robert G. Nilson
Attorney—Murray Robinson and Ned L. Conley

[57] ABSTRACT

Tubular members are connected by telescopically inserting cylindrical pin end of one member into first opening in cylindrical socket end of other member, with a first O-ring seal around pin between pin and socket. Socket has a second opening to medium exterior to members. A second seal between the members encompasses the second opening. The flow path through the connection includes a first flow passage through the first seal and a second flow passage between the seals. The areas encompassed by the seals projected onto a plane perpendicular to the telescopic axis are equal, whereby forces on the connection due to internal pressure are balanced with respect to separation of the connection. The axes of the tubular members are inclined relative to the pin and socket axis so that the tubular members are coaxial or angularly disposed as desired. The balance of pressure enables simple means to be used for holding the members together mechanically, and for the same reason the connection can be made of aluminum or plastics or other low strength materials. A full opening flapper check valve is incorporated in one of the tubular members.

8 Claims, 9 Drawing Figures

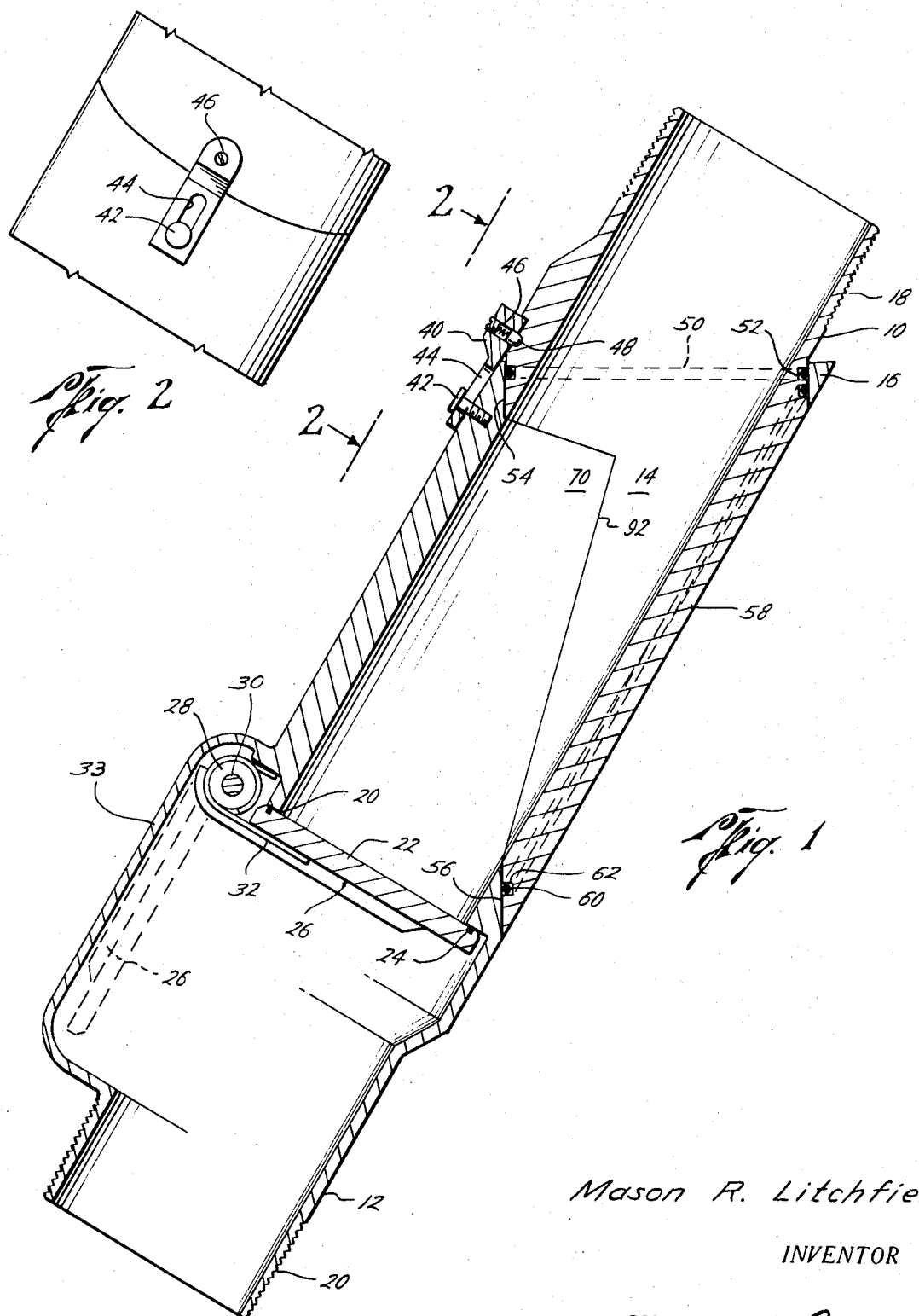

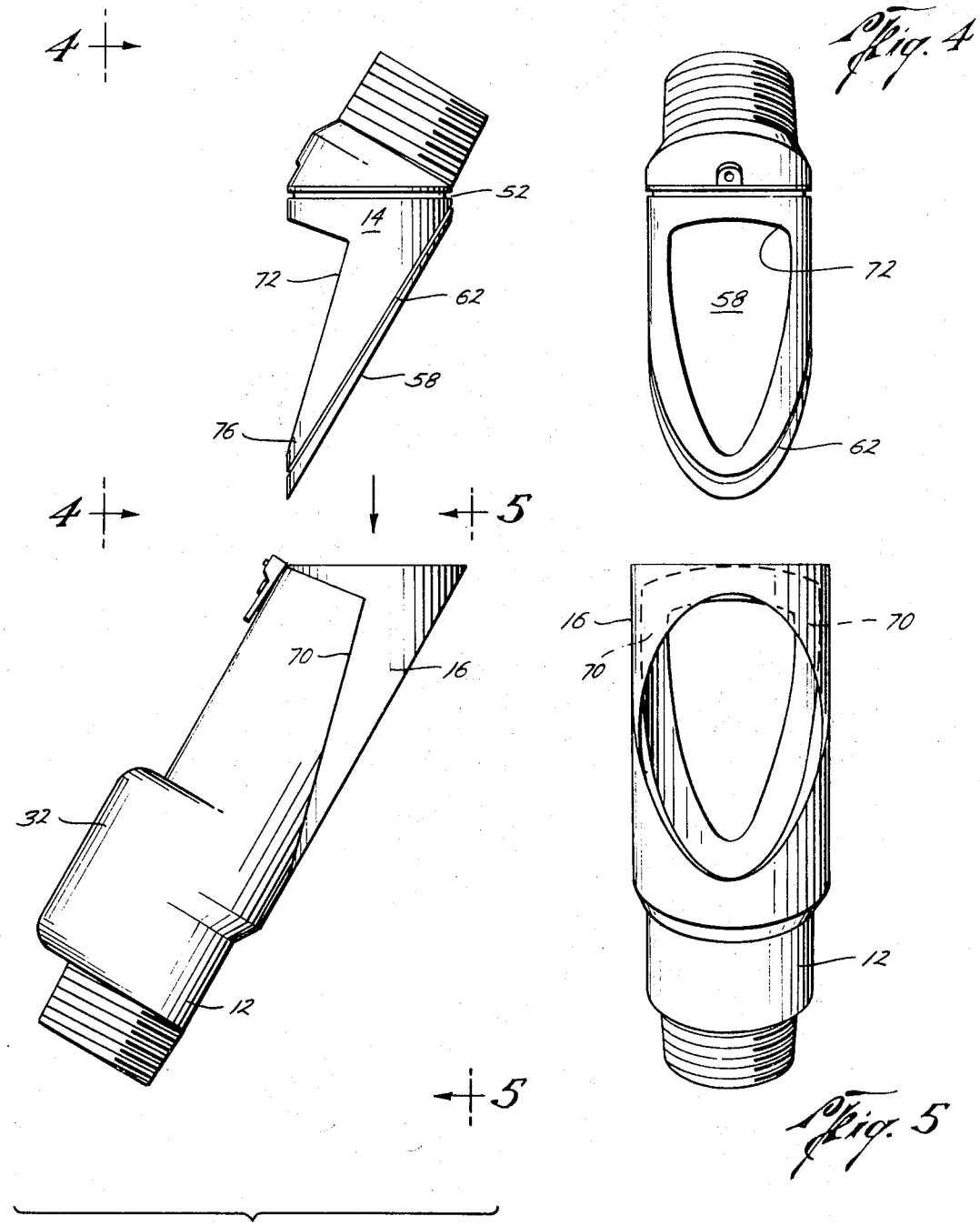

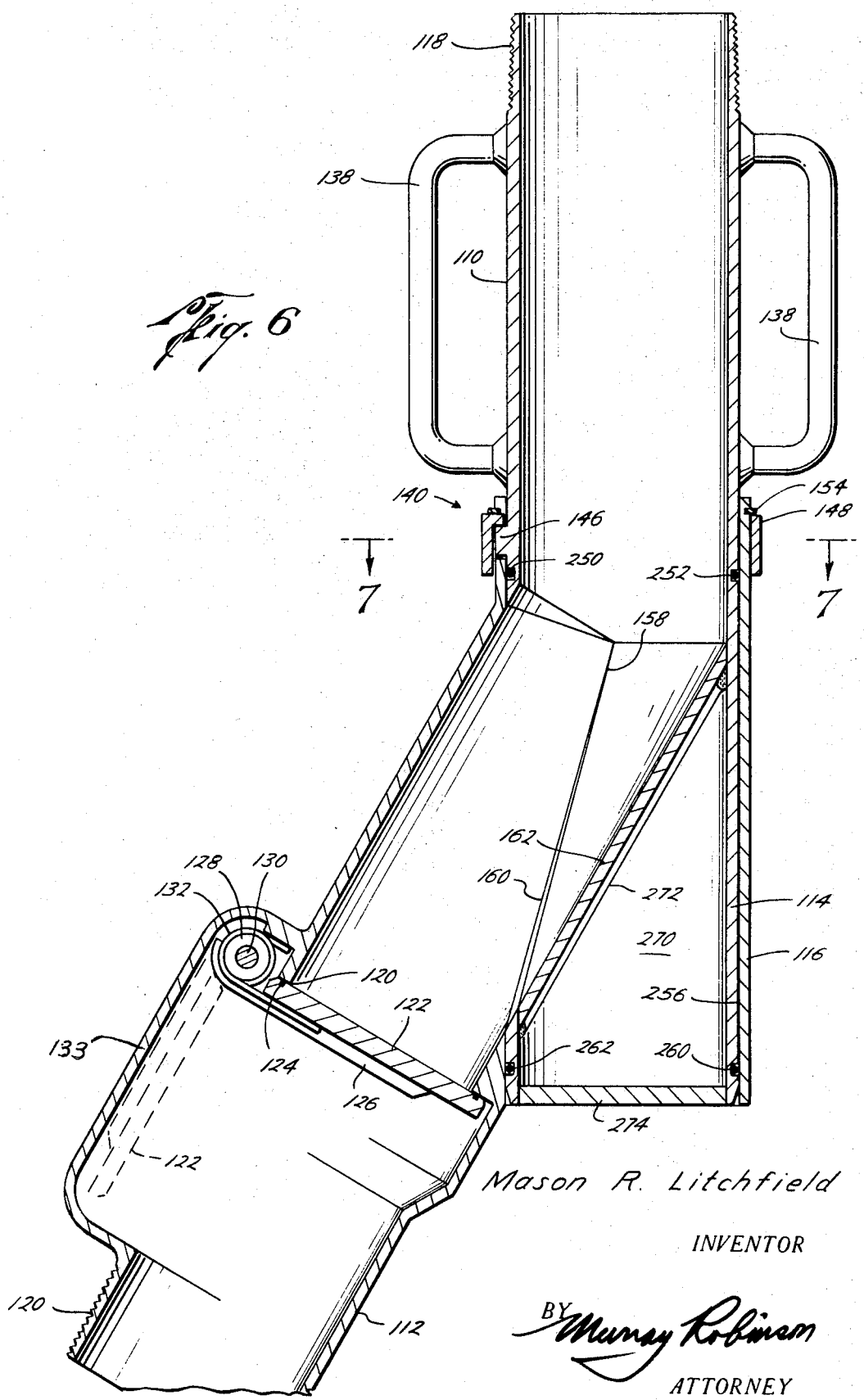

PATENTED OCT 2 1973
3,762,438
SHEET 4 OF 4
Fig. 7
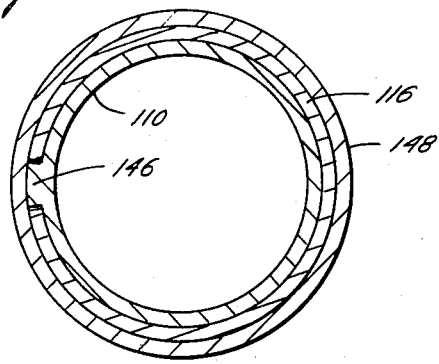
Fig. 8
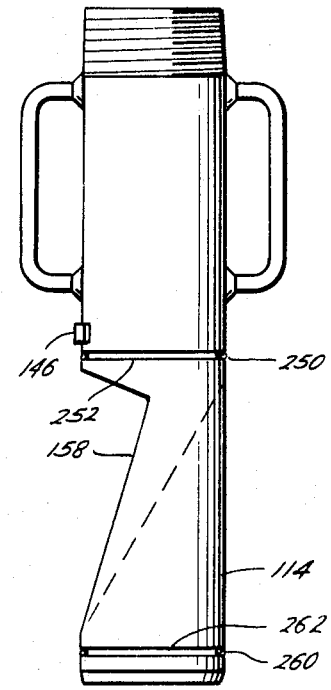
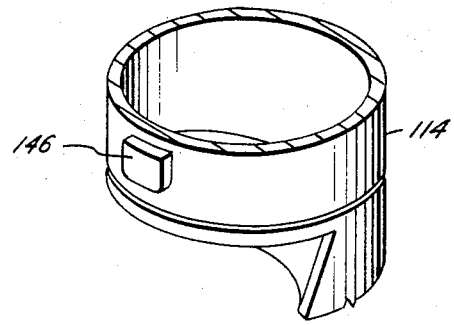
Fig. 9
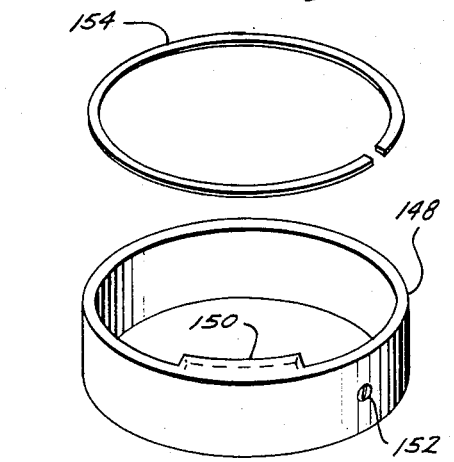
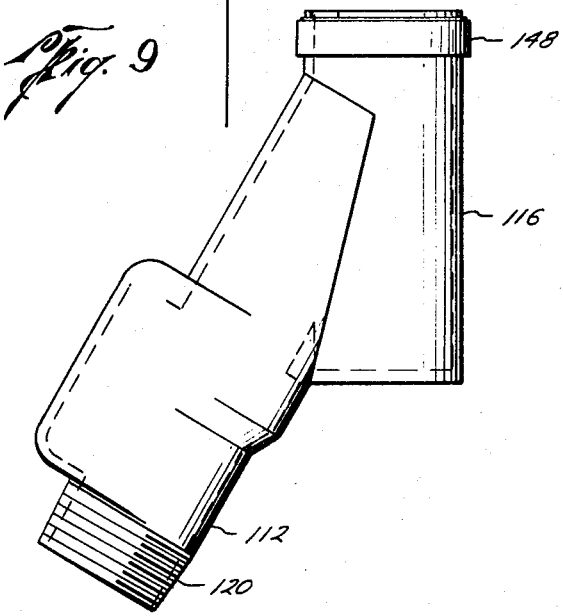
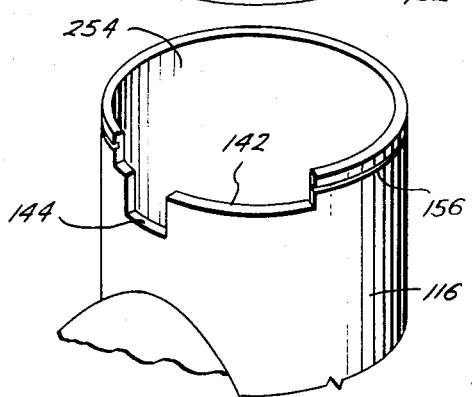
Mason R. Litchfield
INVENTOR
BY Murray Robinson
ATTORNEY

PRESSURE BALANCED CONNECTION

CROSS REFERENCE TO RELATED APPLICATION

This invention is an improvement upon the invention disclosed in the prior application of Mason R. Litchfield, Ser. No. 461,292, filed June 4, 1965, now abandoned.

BACKGROUND OF THE INVENTION

1. Field of the Invention

The invention pertains to connections for tubular members.

2. Description of the Prior Art

It is known to provide a sealed connection between two tubular members by telescopically inserting a pin end of one member into a socket end of the other member, a so called bell and spigot connection. Pressure inside such a connection tends to force the tubular members apart, thereby breaking the connection. For this reason the connection is apt to blow apart at high pressure, and to prevent this strong mechanical means is required to hold the connection together, e.g. screw threads, and this in turn necessitates the use of high strength materials. Usually wrenches or other tools are required to make and break the connection, whereby such make up and break out are slow, time consuming operations.

To overcome the foregoing problem, a construction has been disclosed in U. S. Pat. No. 2,772,898 to Seeler wherein the pin and socket are provided with axially spaced apart annular seals therebetween and the end of the pin is closed, the flow path from the pin to the socket being disposed in the side of the pin between the two seals. This provides a pressure balanced connection. However, in the Seeler construction the flow path through the connection is not a single full opening passage of diameter equal to the inner diameter of the pin.

A construction somewhat similar to the Seeler patent construction is shown in U. S. Pat. No. 2,423,069 to Mc Elhose, et al., but in this construction the pin has an enlarged end and the socket has a reduced end with the result that the pin cannot be inserted into the socket as a unit but must be assembled from separate parts; in addition, the forces on the seals acting against the shoulders formed by the enlarged end of the pin and the reduced end of the socket unbalance the forces on the connection.

SUMMARY OF THE INVENTION

According to the invention a balance of forces due to fluid pressure acting on a telescopic pin and socket connection having a first opening in the socket receiving the pin and a first seal ring therearound is achieved by providing a second opening to atmosphere in the socket member, with a second seal between the pin and the socket extending around the second opening, one part of the flow passage through the connection extending through the pin and the first opening of the socket member, another part of the flow passage through the connection extending between the first and second seal members, the areas of the seals projected on a plane perpendicular to the telescopic axis of the pin and socket being equal, whereby forces on the connection due to fluid pressure are balanced: Manual quickity attachable and detachable means are provided to hold the pin and socket together. The connection is full opening and a full opening flapper check valve is provided in one of the members. The connection can be made of low strength materials such as plastics of thin aluminum if desired.

A preferred embodiment of the invention incorporates also the improvement according to which the axis of the tubular member is inclined to the telescopic axis of the pin and socket, the tubular members being concentric. This embodiment, shown in FIGS. 1 through 5 of the accompanying drawings, though the joint invention of applicant and another and an improvement upon the original sole invention of applicant, shown in FIGS. 6 – 9 of the accompanying drawings, wherein the tubular members are disposed at an angle to each other, will nevertheless be described to illustrate the scope of the original invention of a full opening pressure balanced connection.

BRIEF DESCRIPTION OF DRAWINGS:

FIG. 1 is an axial section through a connection between coaxial tubular members incorporating the invention;

FIG. 2 is a fragmentary elevation taken in the direction indicated at 2—2 in FIG. 1;

FIG. 3 is an exploded view of the connection shown in FIG. 1;

FIGS. 4 and 5 are views of the members forming the connection shown in FIG. 3, taken in the direction indicated at 4—4 and 5—5 on FIG. 3;

FIG. 6 is an axial section through another balanced connection in accordance with the invention;

FIG. 7 is a section taken at plane 7—7 of FIG. 6;

FIG. 8 is an exploded view of the tubular members making up the connection shown in FIG. 6; and FIG. 9 is an exploded view showing elements of mechanical means for holding the connection together.

DESCRIPTION OF PREFERRED EMBODIMENTS

Referring now to FIG. 1 there is shown a connection including a first tubular fluid conducting member 10 and a second tubular fluid conducting member 12 coaxial therewith. A generally cylindrical pin 14 is provided on member 10, the axis of the pin being at an angle to the axis of tubular member 10. A generally cylindrical socket 16 is provided on tubular member 12, the socket axis being at the same angle relative to the axis of member 12 as the angle between the pin and tubular member 12. Screw threads 18 and 20 are provided on the ends of members 10 and 12 opposite from the ends at which are located the pin and socket, such threads providing connector means for making connection with other tubular or nontubular fluid conducting or containing members.

Tubular member 12 included a valve seat 20 and a disc shaped flapper 22 engageable therewith, the flapper carrying on O-ring seal means 24 for sealing with the seat. The flapper is connected by strap 26 to a sleeve 28 which is pivotally disposed around shaft 30. There is a torsion spring 32 around the sleeve 28 biasing the flapper to closed position against seat 20. The shaft 30 is disposed at one side of seat 20 in an asymmetric enlargement 33 in tubular member 12, which accomodates the flapper in open positions (shown in dotted lines), whereby the check valve thus provided in full opening.

For holding the members 10 and 12 together mechanically there is provided a leaf spring latch 40 which is secured to member 12 by a screw 42 extending through slot 44. A screw 46 screwed through latch 40 engages a recess 48 in tubular member 10. When pin 14 is inserted into socket 16, the screw 46 snaps into recess 48. When pin 14 is withdrawn from socket 16, the screw 46 is forced out of recess 48. The spring latch thus forms what is known as a semi-locking means, in that it holds the parts together against a certain force but, without injury to itself, releases the parts when a force in excess of that certain force is exerted.

To provide a fluid tight connection, a first O-ring seal means 50 is disposed in annular circular groove 52 around the pin 14, the seal lying between the pin and the first opening 54 in the socket which receives the pin.

To balance the connection, a second opening 56 is provided in socket 16. This opening is closed by wall 58 of the pin and fluid leakage therepast is prevented by a second O ring seal means 60 disposed in annular, elliptical groove 62 in the pin. The groove 62 is in a cylindrical surface of the pin that is of the same diameter as that in which groove 52 is formed, so that the area encompassed by seal ring 60 when projected on a plane perpendicular to the pin axis is equal to the similar projection of the area encompassed by ring 50. Ring 30 is already in a plane perpendicular to the pin axis, but need not be so necessarily.

Referring now especially to FIGS. 3, 4 and 5, in order to prevent rotation of the socket 16 relative to pin 14, thereby to keep opening 56 in register with wall 58 and seal ring 60, and to keep the axes of members 10 and 12 aligned, there are provided tongues 70 on the socket engaging grooves 72 in the pin. When inserting the pin 14 in the socket 16, with the pin axis at an angle to the socket axis the tip 76 will be slipped under the tongues 70 and then the axis of the pin will be aligned with that of the socket as the parts are engaged farther.

Referring now to FIGS. 6 through 9, and more particularly to FIG. 6, there is shown another embodiment of the invention including a first tubular fluid conducting member 110 and a second fluid conducting member 112 disposed with its axis intersecting the axis of member 110, with the interior angle therebetween being obtuse, e.g. 150°. In this connection the term interior angle means the angle included between adjacent sides of a figure. The reference figure is the triangle whose apices are the threaded ends of the members 110, 112 and the intersection of these members. Although an angle of 150° is shown, any angle in the range from obtuse (greater than 90°) to a straight angle 180° as in FIG. 1) can be used.

A generally cylindrical pin 114 is provided on member 110, this being coaxial with member 110. A generally cylindrical socket 116 is provided on tubular member 112, the socket axis being at the same angle relative to the axis of member 112 as the angle between the two tubular members 110, 112.

Screw threads 118 and 120 are provided on the ends of members 110 and 112 opposite the ends at which are located the pin and socket, such threads providing connector means for making connection with other tubular or nontubular fluid conducting or containing members.

Tubular member 112 includes a valve seat 120 and a disc shaped flapper valve 122 engageable therewith, the flapper carrying an O-ring seal means 124 for sealing with the seal. The flapper is connected by strip 126 to a sleeve 128 which is pivotally disposed around shaft 130. There is a torsion spring 132 around the sleeve 128 biasing the flapper to closed position against seat 120. The shaft 130 is disposed at one side of seal 20 in an asymetric enlargement 133 in tubular member 112, which accomodates the flapper valve in open position (shown in dotted lines), whereby the check valve thus provided is full opening.

To facilitate handling the coupling and valve, a plurality of handles 138 are secured to the outer periphery of tubular member 110.

For holding the members 110 and 112 together mechanically there is provided latch means 140, best shown in FIG. 9. As there shown, the latch means includes a slot 142 in the end of socket 116, with a deeper slot 144 near one end of slot 142. An outwardly extending lug 146 on pin 114 engages slot 144. A lock ring 148 disposed around socket 116 has an inwardly extending lug 150 which fits in slot 142. After lug 146 has been moved into engagement with slot 144, while lug 150 overlies the end of slot 142 leaving passage for lug 146, the lock ring is rotated until lug 150 overlies lug 146 preventing withdrawal thereof from slot 144. A set screw 152 provides means to hold the lock ring against rotation in any desired position, locked or unlocked. To prevent axial displacement of the lock ring 148 relative to socket 116, there is provided a snap ring 154 engageable with annular groove 156 (see FIG. 6).

It is to be noted that the latch means 140 not only prevents relative axial movement of the pin 114 and socket 116, but also prevents rotation thereof, whereby the side opening 158 in the pin is kept in register with the side opening 160 in the socket where the tubular member 112 joins the socket. A curved plate 162 inside the pin defines a smooth full opening flow passage through the mid part of the connection.

To provide fluid tight connection between the pin and socket, a first O-ring seal means 250 is disposed in circular annular groove 252 around the pin 144, the seal lying between the pin and the first opening 254 (See FIG. 9) in the socket 116 which receives pin 114.

To balance the connection, a second opening 256 (see FIG. 6) is provided in socket 116. This opening is closed by the wall 162 and the adjacent portions of pin 114 and fluid leakage therepast is prevented by a second O-ring seal menas 260 disposed in annular circular, groove 262 in the pin 114. The groove is in a cylindrical surface that is of the same diameter as that in which groove 252 is formed so that the area encompassed by said seal ring 260 when projected on a plane perpendicular to the pin axis is equal to the similar projection of the area encompassed by ring 250. Rings 250 and 260 are already in planes perpendicular to the pin axis, but need not be so necessarily.

Preferably the free end of pin 114 is hollow as shown at 270 thereby tightening the construction and facilitating assembly of wall 162, which is welded at 272. The free end of the pin can then be closed by a plate 274, press fitted or otherwise secured in place.

For both embodiments of the invention it will be apparent that because of the pressure balanced construction there is no tendency for the connection to blow apart. This has been tested, in the case of the second described embodiment, by placing caps on the ends of the tubular members and pressurizing the resulting chamber, without any means 140 to hold the members together. There was no relative axial movement of the pin and socket when the chamber was pressurized.

Although the connection is of general utility, it is particularly suitable for connecting flexible lines such as hoses. In connection with hose lines used to convey aerated, pressurized powdery materials such as sugar, the check valve downstream of the coupling prevents back flow from the container into which the material is flowing when a connection is broken, thereby avoiding waste. The handles shown in the second described embodiment are especially desirable in the larger sizes of connections which, partly due to the presence of the check valve, may be somewhat heavy. The connection, usually without the check valve, is well suited for fire hose couplings.

While preferred embodiments of the invention have been shown and described, modified constructions embodying the invention can be made by one skilled in the art without departing from the spirit of the invention.

I claim:

1. A connection comprising first and second tubular members, a first end of each said member being adapted for connection to another element of a fluid system, a second end of one of said tubular members being provided with and opening into a generally cylindrical socket, said socket having a first opening and a second opening to the space outside said one of said tubular members, a second end of the other of said tubular members being provided with and opening into a generally cylindrical pin disposed in said socket, said pin having an end adapted to be inserted through said first opening and including wall means closing said second opening, first seal means between said pin and socket around said first opening, second seal means between said pin and socket around said second opening, the areas encompassed by said seal means projected perpendicularly onto a plane perpendicular to the axis of said pin and socket being equal and the axial force on said socket due to fluid pressure within said socket between seals acting on said socket through said seals being zero, said end of said pin having an opening communicating and registering with the interior of said socket where said second end of said one of said tubular members opens thereinto, thereby providing a flow passage between said pin and socket, said flow passage extending between said first and second seal means, and means for preventing relative rotation of said pin and socket, the interior angle between said tubular members lying in the range from obtuse to a straight angle, said pin having a cross-sectional area perpendicular to its axis equal to the cross-sectional area of said other of said tubular members, and said flow passage between said pin and socket having a cross sectional area perpendicular to the axis of said one of said tubular members equal to the cross-sectional area of said one of said tubular members, whereby a full opening is provided for fluid flow through said connection from one of said first ends of said tubular members to the other of said first ends of said tubular members.

2. Combination according to claim 1, the angle between said tubular members being less than a straight angle.

3. Combination of claim 2 wherein said wall means is a curved plate.

4. Combination of claim 2, wherein the axis of the pin is coaxial with the tubular member joining said pin.

5. Combination of claim 2, wherein a curved flow directing plate is coaxial with the tubular member joining said socket, said plate lying at the junction of the pin and socket.

6. Combination of claim 5 wherein the end of said pin projects beyond said plate away from said other tubular member and is closed by a flat cylindrical plate.

7. Combination according to claim 1, said one of said tubular members that is provided with said socket also being provided with a flapper check valve opening away from said socket and spring biased to closed position, the other of said tubular members being provided with handles.

8. Combination of claim 1 further including means to hold said pin and socket against relative axial movement.

* * * * *